United States Patent
Peev et al.

(10) Patent No.: US 9,652,905 B2
(45) Date of Patent: May 16, 2017

(54) DIAGNOSTIC REPORTING FOR SENSOR INTEGRATED CIRCUITS

(71) Applicant: Melexis Technologies NV, Tessenderlo (BE)

(72) Inventors: Rumen Peev, Sofia (BG); Stoyan Gaydov, Sofia (BG); Klaus Wilczek, Werne (DE)

(73) Assignee: MELEXIS TECHNOLOGIES NV, Tessenderlo (BE)

( * ) Notice: Subject to any disclaimer, the term of this patent is extended or adjusted under 35 U.S.C. 154(b) by 0 days.

(21) Appl. No.: 15/041,805

(22) Filed: Feb. 11, 2016

(65) Prior Publication Data

US 2016/0232724 A1      Aug. 11, 2016

Related U.S. Application Data

(60) Provisional application No. 62/114,856, filed on Feb. 11, 2015.

(51) Int. Cl.
   *G01M 17/00*   (2006.01)
   *G07C 5/08*    (2006.01)
   *G01D 3/08*    (2006.01)

(52) U.S. Cl.
   CPC .............. *G07C 5/0808* (2013.01); *G01D 3/08* (2013.01)

(58) Field of Classification Search
   CPC ................................ G07C 5/0808; G01D 3/08
   See application file for complete search history.

(56) References Cited

U.S. PATENT DOCUMENTS

| 5,673,278 A | 9/1997 | Mills et al. |
| 5,708,414 A * | 1/1998 | Peltier ................. G08B 17/107 250/574 |
| 6,127,942 A | 10/2000 | Welle |
| 6,404,163 B1 * | 6/2002 | Kapsokavathis ..... H02J 7/0029 320/104 |

(Continued)

FOREIGN PATENT DOCUMENTS

| EP | 0841219 A2 | 5/1998 |
| EP | 1251474 A1 | 10/2002 |

(Continued)

OTHER PUBLICATIONS

European Search Report from EP Application No. 16162504.1, Jun. 29, 2016.

(Continued)

*Primary Examiner* — Adam Alharbi
(74) *Attorney, Agent, or Firm* — Workman Nydegger

(57) ABSTRACT

A sensor integrated circuit comprising a controller and a diagnostic module in communication with the controller. The controller is configured for providing a diagnostic reporting signal being a periodic superposition signal on a sensing output of the sensor integrated circuit and/or on a supply current of the sensor integrated circuit. The periodic superposition signal has periodic pulses with a predetermined fixed pulse duration and a predetermined periodicity. The controller furthermore is configured for altering the predetermined periodicity or predetermined fixed pulse duration of the periodic superposition signal upon a fault detection in the diagnostic module communicated to the controller.

14 Claims, 1 Drawing Sheet

(56) References Cited

U.S. PATENT DOCUMENTS

| | | |
|---|---|---|
| 6,424,143 B1 | 7/2002 | Blossfeld et al. |
| 7,124,655 B2 | 10/2006 | Blossfeld |
| 2002/0153885 A1 | 10/2002 | Blossfeld |
| 2004/0113790 A1 | 6/2004 | Hamel et al. |
| 2012/0158321 A1 | 6/2012 | Bommer et al. |
| 2013/0060496 A1 | 3/2013 | Narita |
| 2014/0117927 A1 | 5/2014 | Chateau et al. |
| 2014/0138432 A1 | 5/2014 | Park et al. |

FOREIGN PATENT DOCUMENTS

| | | |
|---|---|---|
| EP | 2827606 A2 | 1/2015 |
| WO | 2011057904 A1 | 5/2011 |
| WO | 2014003862 A2 | 1/2014 |

OTHER PUBLICATIONS

Extended European Search Report from corresponding EP Application No. EP16155175.9, Jul. 1, 2016.

\* cited by examiner

DIAGNOSTIC REPORTING FOR SENSOR INTEGRATED CIRCUITS

FIELD OF THE INVENTION

The invention relates to the field of diagnostic reporting for sensor integrated circuits. More specifically, the present invention relates to methods and systems for performing diagnostic reporting in sensor integrated circuits to fulfill functional safety requirements.

BACKGROUND OF THE INVENTION

In order to have a high functional safety for electronic systems in road vehicles, a standard was set, referred to as Automotive Safety Integrity Level (ASIL).

One basic approach to cover the Functional Safety requirements for sensor Integrated Circuits (IC) is to integrate a periodic diagnostic of the IC. The result of the diagnostic is reported to the system ECU (Electronic Control Unit). In order to allow this diagnostic reporting, a communication channel for diagnostic reporting and/or for diagnostic requests is required.

Most used sensors have only two or three pins, i.e. two or three channels through which the sensor can communicate or is supplied/delivers signals.

In a 3-wire sensor application, an example of the typical pin usage is as follows: one pin for Ground, one pin for Supply and one pin for Sensor Output (often Open-drain output). In known 3-Wire magnetic sensors the sensor output is switched low or high depending on the applied magnetic field (below or above the corresponding threshold).

In a 2-wire sensor application, an example of a typical pin usage is as follows: one pin for Ground and one pin for Supply, where the sensor output signal is send by supply current modulation with two fixed DC current levels. The sensor supply current is switched between two predefined low or high values depending on the applied magnetic field (below or above the corresponding threshold).

In order to cope with the additional communication requirements for diagnostic reporting, some solutions have been suggested.

A first solution is to provide diagnostic reporting on request, using an additional pin. The diagnostic result is reported after receiving a dedicated request (high level) from an additional pin. This nevertheless requires an additional pin leading to package limitations and to a higher cost in manufacturing time and additional components. The main function typically is not available during diagnostic.

A second suggested solution is to combine the main function output signal and diagnostic output signal, by setting, at diagnostic fail, the output in one of both operating states. Nevertheless, this results in a bad separation between the main function output signal and the diagnostic output signal leading to application limitations (e.g. there is no diagnostic if the main function output signal is high). Furthermore, there is a low diagnostic coverage of the open-drain output.

Consequently, there is still need for a good solution for arranging communication for diagnostic reporting in sensor integrated circuits.

SUMMARY OF THE INVENTION

It is an object of the present invention to provide good methods and systems for providing diagnostic reporting from sensor integrated circuits.

It is an advantage of embodiments of the present invention that no additional pins are required for diagnostic requesting or diagnostic reporting.

It is an advantage of embodiments of the present invention that the main function output signal and the periodic superposition signal, e.g. referred to as diagnostic output signal, can be easily separated in an electronic control unit (ECU) by software processing or by simple analogue filtering.

The above objective is accomplished by a method and device according to the present invention.

The present invention relates to a sensor integrated circuit, the sensor integrated circuit comprising a controller and a diagnostic module in communication with the controller, the controller being configured for providing a diagnostic reporting signal, the diagnostic reporting signal being a periodic superposition signal on a sensing output of the sensor integrated circuit and/or on a supply current of the sensor integrated circuit, wherein the periodic superposition signal has periodic pulses with a predetermined fixed pulse duration and a predetermined periodicity, the controller furthermore being configured for altering the predetermined periodicity or predetermined fixed pulse duration of the periodic superposition signal upon a fault detection in the diagnostic module communicated to the controller.

The diagnostic reporting signal may be generated automatically triggered by the diagnostic module without external request posed outside the sensor integrated circuit.

The fixed pulse duration may be substantially shorter than the repetition period of the periodic superposition signal.

Altering the periodicity of the periodic superposition signal may comprise stopping the periodic superposition signal to be superposed to the sensing output signal or supply signal.

The predetermined fixed pulse duration and/or the predetermined periodicity may be determined based on an internal operating cycle of the sensor integrated circuit.

The predetermined fixed pulse duration and/or the predetermined periodicity may correspond with the operating period of a micro-power sensor using Active/Standby cycling for power saving.

The predetermined fixed pulse duration and/or the predetermined periodicity may correspond with the measurement cycle in the sensor.

The predetermined fixed pulse duration and/or the predetermined periodicity may be settable.

The diagnostic reporting signal may be a periodic superposition signal on a sensing output of the sensor integrated circuit.

Periodic pulses may have opposite polarity with respect to the sensing output.

The controller may be furthermore adapted for, when a fault detection is communicated to the controller, inducing any of putting the sensing output to constant high, putting the sensing output to constant low or continuing the sensing output based on the sensed signal.

The periodic superposition signal may be only implemented when the sensing output is in a high state or only implemented when the sensing output is in a low state.

The diagnostic reporting signal may be a periodic superposition signal on a supply signal.

The sensor may be a micro-power sensor using Active/Standby cycling for power saving, and the periodic superposition signal may correspond with the driving signal for the Active/Standby cycling, the controller may be adapted for altering the periodicity or duration of the Active/Standby cycling upon a fault detection in the diagnostic module communicated to the controller.

The present invention also relates to a controller for use in a sensor integrated circuit, the controller being configured for communicating with a diagnostic module and for providing a diagnostic reporting signal, the diagnostic reporting signal being a periodic superposition signal on a sensing output of the sensor integrated circuit and/or on a supply current of the sensor integrated circuit, wherein the periodic superposition signal has periodic pulses with a predetermined fixed pulse duration and a predetermined periodicity, the controller furthermore being configured for altering the predetermined periodicity or predetermined fixed pulse duration of the periodic superposition signal upon a fault detection in the diagnostic module communicated to the controller.

The present invention also relates to a method for diagnostic reporting, the method comprising providing a diagnostic reporting signal, the diagnostic reporting signal being a periodic superposition signal on a sensing output of the sensor integrated circuit and/or on a supply current of the sensor integrated circuit, wherein the periodic superposition signal has periodic pulses with a predetermined fixed pulse duration and a predetermined periodicity, and altering the predetermined periodicity or predetermined fixed pulse duration of the periodic superposition signal upon a fault detection in the diagnostic module communicated to the controller.

The present invention also relates to an electronic control unit for co-operating with a sensor integrated circuit, the electronic control unit comprising receiving a supply current signal or an output signal from the sensor integrated circuit and detecting a diagnostic reporting signal being a periodic superposition signal on the sensing output of the sensor integrated circuit and/or on the supply current of the sensor integrated circuit, wherein the periodic superposition signal has periodic pulses with a predetermined fixed pulse duration and a predetermined periodicity, and determining a change in the predetermined periodicity or predetermined fixed pulse duration of the periodic superposition signal for identifying a diagnostic fault.

The periodic superposition signal may be superposed to the sensing output.

It is an advantage of embodiments of the present invention that diagnostic reporting using PWM and signal data reporting using PWM can be done using one and the same pin.

It is an advantage of some embodiments of the present invention that the main function output signal and the periodic superposition signal, e.g. referred to as the diagnostic output signal, can be easily separated in the electronic control unit (ECU) by software processing or by simple analogue filtering.

It is an advantage of embodiments of the present invention that the periodic superposition signal, e.g. referred to as output ticking, allows very high additional diagnostic coverage of the output driver and oscillator (clock generator) implemented in the sensor IC.

It is an advantage of embodiments of the present invention that the periodic superposition signal may for example be ticking pulses with programmable period and/or duration.

It is an advantage of embodiments of the present invention that the periodic superposition signal may significantly increase the diagnostic coverage of the integrated control logic.

It is an advantage of embodiments of the present invention that the diagnostic coverage of the integrated control logic can be further increased if the period and/or duration of the periodic superposition signal is implemented as derivative of some important internal operating cycle in the sensor IC (like the operating period in a micro-power sensor using Active/Standby cycling for power saving).

The periodic superposition signal may be superposed to the supply current.

It is an advantage of embodiments of the present invention that, for a 3-Wire application, the main function output signal and the periodic superposition signal, also referred to as diagnostic output signal (supply current ticking pulses), can advantageously be physically separated.

It is an advantage of embodiments of the present invention that, for a 2-Wire application, the main function output signal and the periodic superposition signal, also referred to as diagnostic output signal, could be easily separated in the ECU by software processing or by simple analogue filter.

It is an advantage of embodiments of the present invention that the periodic superposition signal, also referred to as supply current ticking, allows very high additional diagnostic coverage of the oscillator (clock generator) implemented in the sensor IC.

It is an advantage of embodiments of the present invention that the use of a periodic superposition signal increases significantly the diagnostic coverage of the integrated control logic.

It is an advantage of embodiments of the present invention that the diagnostic coverage of the integrated control logic can be further increased if the periodic superposition signal, e.g. also referred to as supply current ticking, has a period and/or duration which is implemented as derivative of some important internal operating cycle in the sensor IC (like the operating period in a micro-power sensor using Active/Standby cycling for power saving).

Particular and preferred aspects of the invention are set out in the accompanying independent and dependent claims. Features from the dependent claims may be combined with features of the independent claims and with features of other dependent claims as appropriate and not merely as explicitly set out in the claims.

These and other aspects of the invention will be apparent from and elucidated with reference to the embodiment(s) described hereinafter.

Figure 1:
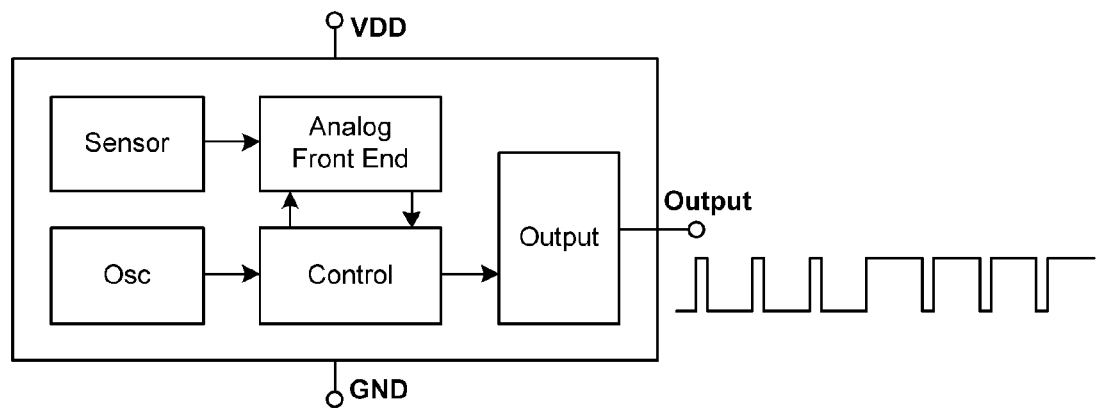
FIG. 1 illustrates an implementation of an output ticking solution in a 3-wire sensor, according to an embodiment of the present invention.

Any reference signs in the claims shall not be construed as limiting the scope.

In the different drawings, the same reference signs refer to the same or analogous elements.

DETAILED DESCRIPTION OF ILLUSTRATIVE EMBODIMENTS

The present invention will be described with respect to particular embodiments and with reference to certain drawings but the invention is not limited thereto but only by the claims. The dimensions and the relative dimensions do not correspond to actual reductions to practice of the invention.

Furthermore, the terms first, second and the like in the description and in the claims, are used for distinguishing between similar elements and not necessarily for describing a sequence, either temporally, spatially, in ranking or in any other manner. It is to be understood that the terms so used are interchangeable under appropriate circumstances and that the embodiments of the invention described herein are capable of operation in other sequences than described or illustrated herein.

Moreover, the terms top, under and the like in the description and the claims are used for descriptive purposes and not necessarily for describing relative positions. It is to be understood that the terms so used are interchangeable under appropriate circumstances and that the embodiments of the invention described herein are capable of operation in other orientations than described or illustrated herein.

It is to be noticed that the term "comprising", used in the claims, should not be interpreted as being restricted to the means listed thereafter; it does not exclude other elements or steps. It is thus to be interpreted as specifying the presence of the stated features, integers, steps or components as referred to, but does not preclude the presence or addition of one or more other features, integers, steps or components, or groups thereof. Thus, the scope of the expression "a device comprising means A and B" should not be limited to devices consisting only of components A and B. It means that with respect to the present invention, the only relevant components of the device are A and B.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

Similarly it should be appreciated that in the description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the detailed description are hereby expressly incorporated into this detailed description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those in the art. For example, in the following claims, any of the claimed embodiments can be used in any combination.

In the description provided herein, numerous specific details are set forth. However, it is understood that embodiments of the invention may be practiced without these specific details. In other instances, well-known methods, structures and techniques have not been shown in detail in order not to obscure an understanding of this description.

In a first aspect, the present invention relates to a sensor integrated circuit comprising a controller and a diagnostic module in communication with the controller. The sensor thus is adapted for providing a high functional safety for electronic systems in road vehicles. The sensor can for example be compatible with the Automotive Safety Integrity Level (ASIL) standard. Such sensors may be typically used for position sensing for ignition keys, the steering wheel, the brake light, the clutch, the gear shift, etc. According to embodiments of the present invention, the controller is configured for providing a diagnostic reporting signal, the diagnostic reporting signal being a periodic superposition signal on a sensing output of the sensor integrated circuit. Alternatively or in addition thereto the controller is configured for providing a diagnostic reporting signal being a periodic superposition signal on a supply current of the sensor integrated circuit. The periodic superposition signal has periodic pulses with a predetermined fixed pulse duration and a predetermined periodicity. According to embodiments of the present invention, the controller furthermore is configured for altering the predetermined periodicity or predetermined fixed pulse duration of the periodic superposition signal upon a fault detection in the diagnostic module communicated to the controller.

Specific features and advantages of embodiments of the present invention are set out in the dependent claims. Some features and advantages are further described below, with reference to exemplary embodiments as described below, with reference to FIG. 1 and FIG. 2.

As indicated above, embodiments of the present aspect refer to a sensor integrated circuit. Such a sensor integrated circuit typically may comprise the sensor itself, which may be any suitable type of sensor such as for example a magnetic sensor, an electric sensor, a pressure sensor, a temperature, an image, an optical signal, etc. In the sensor integrated circuits according to embodiments of the present invention, a diagnostic module is integrated in the IC to integrate a periodic diagnostic of the IC. The sensor integrated circuit also may comprise an oscillator, an analog front end. According to embodiments of the present invention, the sensor integrated circuit also comprises a controller, as described above. According to some embodiments, the sensor integrated circuit comprises three pins for connecting, one pin GND for providing a ground signal to the sensor, one pin VDD for providing a supply current signal and one pin OUTPUT for providing a sensing output. The output may be an open-drain output. In such 3-pin sensors, the sensor output is switched low or high depending on the signal measured (i.e. depending whether the sensing signal measured is below or above the corresponding threshold). An example of such a circuit is shown in FIG. 1. According to some 3-pin integrated circuit embodiments of the present invention, a diagnostic reporting signal from a diagnostic module in the integrated circuit is outputted as a periodic superposition signal on the sensing output.

In an embodiment of the present invention, the 3-Wire sensor output pin is used for diagnostic reporting without interruption of the normal output function.

As indicated above, the sensor integrated circuit also comprises a controller. The controller thereby is adapted such that the integrated diagnostic is repeating automatically without external request. The controller is configured for providing a diagnostic sensing signal by sending periodic output pulses (output ticking) with fixed duration substantially shorter than the fixed repetition period. The pulses may have opposite polarity versus the output state corresponding to the sensor input. The output ticking period and the diagnostic repetition period typically are within a Fault Tolerant Time Interval of the system. Detection of a fault is performed by the controller introducing in the diagnostic sensing signal an indication of such a fault. The latter is performed by altering the periodicity or pulse duration in the periodic signal. E.g. if the duration between any two sequential output state edges (excluding the second edge of each output ticking pulse) becomes different from the nominal ticking period±given tolerance, then this is assumed as fail message.

Three examples of implementation variants to stop the output ticking due to an integrated diagnostic fail are: the sensor output will be set constant high or constant low or to continue following the sensor input (but without output ticking).

In one embodiment, the output ticking period and/or duration could be a derivative of some important internal operating cycle in the sensor, such as for example the operating period in a micro-power sensor using Active/Standby cycling for power saving. This will for example improve the diagnostic coverage of the integrated control logic.

In one embodiment, the output ticking period and/or duration is programmable in order to fit better to different application requirements.

In some embodiments, the output ticking is implemented only with output high.

In some embodiments, the output ticking is implemented only with output low.

Figure 2:
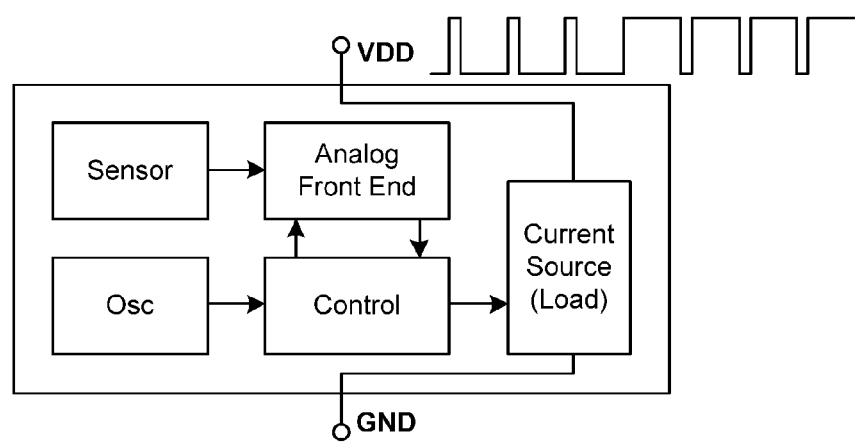
FIG. 2 illustrates an implementation of a supply current ticking solution in a 2-wire sensor, according to an embodiment of the present invention.

In another set of embodiments, 2-pin sensor integrated circuits are used, an example thereof being shown in FIG. 2. The 2-pin sensor integrated circuit comprises a pin GND for providing a ground signal and a pin VDD for providing a supply current. The pin VDD is used for sending the sensor output signal by supply current modulation with two fixed DC current levels. The sensor supply current is switched between two predefined low or high values depending on the applied magnetic field (below or above the corresponding threshold). The latter may for example be performed using a current source.

According to some embodiments of the present invention, either in a 2-pin sensor integrated circuit or in a 3-pin sensor integrated circuit, a diagnostic reporting signal from a diagnostic module in the integrated circuit is outputted as a periodic superposition signal on the supply current, instead of on the sensing output. The solution may for example be based on a supply current modulation using periodic supply current pulses (ticking) with defined period and duration for sending diagnostic messages. The integrated diagnostic may be repeating automatically without external request. In case of integrated diagnostic pass the sensor is sending periodic supply current pulses (supply ticking) with fixed duration and fixed repetition period. The current ticking period and the diagnostic repetition period have to be within the Fault Tolerant Time Interval of the system. If the repetition period and/or the duration of the supply pulses become different from the nominal value±given tolerance, then this is assumed as fail message.

In one aspect, the present invention also relates to a controller, as can be implemented in a sensor integrated circuit. The controller thereby is configured for communicating with a diagnostic module and for providing a diagnostic reporting signal. The diagnostic reporting signal thereby is a periodic superposition signal on a sensing output of the sensor integrated circuit and/or on a supply current of the sensor integrated circuit. The periodic superposition signal has periodic pulses with a predetermined fixed pulse duration and a predetermined periodicity. According to embodiments, the controller furthermore is configured for altering the predetermined periodicity or predetermined fixed pulse duration of the periodic superposition signal upon a fault detection in the diagnostic module communicated to the controller. Further features and advantages of embodiments of the present invention correspond with those features and advantages as set out for the controller in the sensor integrated circuit in the first aspect of the present invention.

In yet another aspect, the present invention relates to a method for diagnostic reporting. The method comprises the steps of providing a diagnostic reporting signal, the diagnostic reporting signal being a periodic superposition signal on a sensing output of the sensor integrated circuit and/or on a supply current of the sensor integrated circuit, wherein the periodic superposition signal has periodic pulses with a predetermined fixed pulse duration and a predetermined periodicity, and altering the predetermined periodicity or predetermined fixed pulse duration of the periodic superposition signal upon a fault detection in the diagnostic module communicated to the controller. Further method steps and advantages of method embodiments of the present invention correspond with the functionality provided by the different device features described for the sensor integrated circuit in the first aspect of the present invention. The method may be advantageously performed using a sensor integrated circuit as described in the first aspect of the present invention.

In still another aspect, the present invention also relates to an electronic control unit for co-operating with a sensor integrated circuit for obtaining diagnostic reporting information of the sensor integrated circuit. According to embodiments of the present invention, the electronic control unit comprising receiving a supply current signal or an output signal from the sensor integrated circuit and detecting a diagnostic reporting signal being a periodic superposition signal on supply current of the sensor integrated circuit and/or on the sensing output of the sensor integrated circuit, wherein the periodic superposition signal has periodic pulses with a predetermined fixed pulse duration and a predetermined periodicity. According to embodiments of the present invention, the electronic control unit is configured for determining a change in the predetermined periodicity or predetermined fixed pulse duration of the periodic superposition signal for identifying a diagnostic fault. Detecting a diagnostic reporting signal may for example comprise signal processing or applying an analogue filter.

The invention claimed is:

1. A sensor integrated circuit, the sensor integrated circuit comprising a controller and a diagnostic module in communication with the controller,
    the controller being configured for providing a diagnostic reporting signal, the diagnostic reporting signal being a periodic superposition signal on a sensing output of the sensor integrated circuit and/or on a supply current of the sensor integrated circuit, wherein the periodic superposition signal has periodic pulses with a predetermined fixed pulse duration and a predetermined periodicity,
    the controller furthermore being configured for altering the predetermined periodicity or predetermined fixed pulse duration of the periodic superposition signal upon a fault detection in the diagnostic module communicated to the controller;

wherein the predetermined fixed pulse duration and/or the predetermined periodicity corresponds with the operating period of a micro-power sensor using Active/Standby cycling for power saving, and/or the predetermined fixed pulse duration and/or the predetermined periodicity corresponds with the measurement cycle in the sensor.

2. A sensor integrated circuit according to claim 1, wherein the diagnostic reporting signal is generated automatically triggered by the diagnostic module without external request posed outside the sensor integrated circuit.

3. A sensor integrated circuit according to claim 1, wherein the fixed pulse duration is substantially shorter than the repetition period of the periodic superposition signal.

4. A sensor integrated circuit according to claim 1, wherein altering the periodicity of the periodic superposition signal comprises stopping the periodic superposition signal to be superposed to the sensing output signal or supply signal.

5. A sensor integrated circuit according to claim 1, wherein the predetermined fixed pulse duration and/or the predetermined periodicity is determined based on an internal operating cycle of the sensor integrated circuit.

6. A sensor integrated circuit according to claim 1, wherein the predetermined fixed pulse duration and/or the predetermined periodicity is settable.

7. A sensor integrated circuit according to claim 1, wherein the diagnostic reporting signal is a periodic superposition signal on a sensing output of the sensor integrated circuit.

8. A sensor integrated circuit according to claim 7, wherein periodic pulses have opposite polarity with respect to the sensing output.

9. A sensor integrated circuit according to claim 1, wherein the controller is furthermore adapted for, when a fault detection is communicated to the controller, inducing any of putting the sensing output to constant high, putting the sensing output to constant low or continuing the sensing output based on the sensed signal.

10. A sensor integrated circuit according to claim 1, wherein the periodic superposition signal is only implemented when the sensing output is in a high state or only implemented when the sensing output is in a low state.

11. A sensor integrated circuit according to claim 1, wherein the diagnostic reporting signal is a periodic superposition signal on a supply signal.

12. A sensor integrated circuit according to claim 11,
wherein the sensor is a micro-power sensor using Active/Standby cycling for power saving, and
whereby the periodic superposition signal corresponds with or is multiple to the driving signal for the Active/Standby cycling, the controller being adapted for altering the periodicity or duration of the Active/Standby cycling upon a fault detection in the diagnostic module communicated to the controller.

13. A controller for use in a sensor integrated circuit, the controller being configured for communicating with a diagnostic module and for providing a diagnostic reporting signal,
the diagnostic reporting signal being a periodic superposition signal on a sensing output of the sensor integrated circuit and/or on a supply current of the sensor integrated circuit,
wherein the periodic superposition signal has periodic pulses with a predetermined fixed pulse duration and a predetermined periodicity,
the controller furthermore being configured for altering the predetermined periodicity or predetermined fixed pulse duration of the periodic superposition signal upon a fault detection in the diagnostic module communicated to the controller;
wherein the predetermined fixed pulse duration and/or the predetermined periodicity corresponds with the operating period of a micro-power sensor using Active/Standby cycling for power saving, and/or the predetermined fixed pulse duration and/or the predetermined periodicity corresponds with the measurement cycle in the sensor.

14. A method for diagnostic reporting, the method comprising
providing a diagnostic reporting signal, the diagnostic reporting signal being a periodic superposition signal on a sensing output of the sensor integrated circuit and/or on a supply current of the sensor integrated circuit, wherein the periodic superposition signal has periodic pulses with a predetermined fixed pulse duration and a predetermined periodicity, and
altering the predetermined periodicity or predetermined fixed pulse duration of the periodic superposition signal upon a fault detection in the diagnostic module communicated to the controller;
wherein the predetermined fixed pulse duration and/or the predetermined periodicity corresponds with the operating period of a micro-power sensor using Active/Standby cycling for power saving, and/or the predetermined fixed pulse duration and/or the predetermined periodicity corresponds with the measurement cycle in the sensor.

\* \* \* \* \*